(12) United States Patent
Rigo

(10) Patent No.: US 8,607,711 B2
(45) Date of Patent: Dec. 17, 2013

(54) MOST INNOVATIVE MODE OF TRANSPORTATION, CALLED A TRAIN FERRY ON A FOUR TRACK RAIL SYSTEM

(76) Inventor: Alfred (Fred) Rigo, Milton (CA)

(*) Notice: Subject to any disclaimer, the term of this patent is extended or adjusted under 35 U.S.C. 154(b) by 0 days.

(21) Appl. No.: 12/660,133

(22) Filed: Apr. 26, 2010

(65) Prior Publication Data
US 2010/0258028 A1 Oct. 14, 2010

(51) Int. Cl.
*B61B 13/00* (2006.01)
(52) U.S. Cl.
USPC .......................................... 104/307
(58) Field of Classification Search
USPC ............. 104/307; 105/158.1, 159, 178, 215.1
See application file for complete search history.

(56) References Cited

U.S. PATENT DOCUMENTS

| | | | | |
|---|---|---|---|---|
| 194,899 A * | 9/1877 | Eckman | ..................... | 104/243 |
| 195,957 A * | 10/1877 | Shelby | ..................... | 104/307 |
| 862,328 A * | 8/1907 | Stirring | ..................... | 24/561 |
| 1,392,523 A * | 10/1921 | Pereire et al. | ..................... | 105/168 |
| 2,146,203 A * | 2/1939 | Demarest | ..................... | 414/495 |
| 2,183,913 A * | 12/1939 | Jabelmann | ..................... | 105/1.2 |
| 3,285,194 A * | 11/1966 | Deodat | ..................... | 104/27 |
| 3,503,340 A * | 3/1970 | Warren | ..................... | 410/24 |
| 3,557,712 A * | 1/1971 | Milenkovic | ..................... | 410/4 |
| 3,707,125 A * | 12/1972 | Milenkovic et al. | ..................... | 105/179 |
| 3,892,188 A * | 7/1975 | Warren | ..................... | 410/28 |
| 3,896,946 A * | 7/1975 | Forsyth et al. | ..................... | 414/544 |
| 3,902,433 A * | 9/1975 | Borchert et al. | ..................... | 105/182.1 |
| 2010/0107920 A1 * | 5/2010 | Pulliam | ..................... | 104/307 |

* cited by examiner

*Primary Examiner* — Zachary Kuhfuss

(57) ABSTRACT

The Innovative Four Railroad Track Systems expands present two track rail systems to support the use of twenty foot wide cars that will simplify the loading, unloading and therefore transportation of many goods, especially vehicles and similar sized construction or farm equipment. The extra two rails are added on the outside of the current track in single rail lines. The expanded width of the cars allows for loading and unloading from the side which can be facilitated in the case of vehicles through a tiered loading dock much the same as is done with a ferry, hence the name "train ferry". This will drastically reduce the time and effort required and revolutionizes the bulk transportation of these goods.

5 Claims, 14 Drawing Sheets

MOST INNOVATIVE MODE OF TRANSPORTATION, CALLED A TRAIN FERRY ON A FOUR TRACK RAIL SYSTEM

BACKGROUND OF THE INVENTION

What started me on this venture was when I researched who invented the wheel. What I found in one article was that the Egyptians invented the wheel four thousand years ago and used it for their two wheel chariots.

What surprised me was the fact that since then we have always adapted to a two wheel system, automobiles, trains, trucks, etc.

As I have always lived near railroads and having worked at Ford Motor Co., I began to notice the transportation of automobiles by the present RailRoad Auto Transporter Cars and realized the possibility of building a wider rail car for that use. Of course I have expanded it to many other uses for these 20 foot wide rail cars on a four track rail system.

SUMMARY OF THE INVENTION

In an article of the Train magazine dated January 2010, page 15, it details how over 43,000 rollovers of rail tank cars have happened since the 1970s.

I question whether there would be any rollovers from a four track rail system because of the width of the rail cars. The four wheel cars should be more stable and less of a risk to rollover.

My idea of a four track rail system is to convince some railroads to take it over. Where there are single tracks these can be modified to the four track rail system by adding an additional rail on either side which would allow the new rail cars to be 20 feet wide from the present 10 feet wide.

To build a new four track rail system it still requires to build a standard rail system in the centre, as the engines do not change.

As a tourist train it would require several train engineers, therefore, we incorporated the small crew cabin car (with a wind deflector) for off shift engineers.

Figure 1:
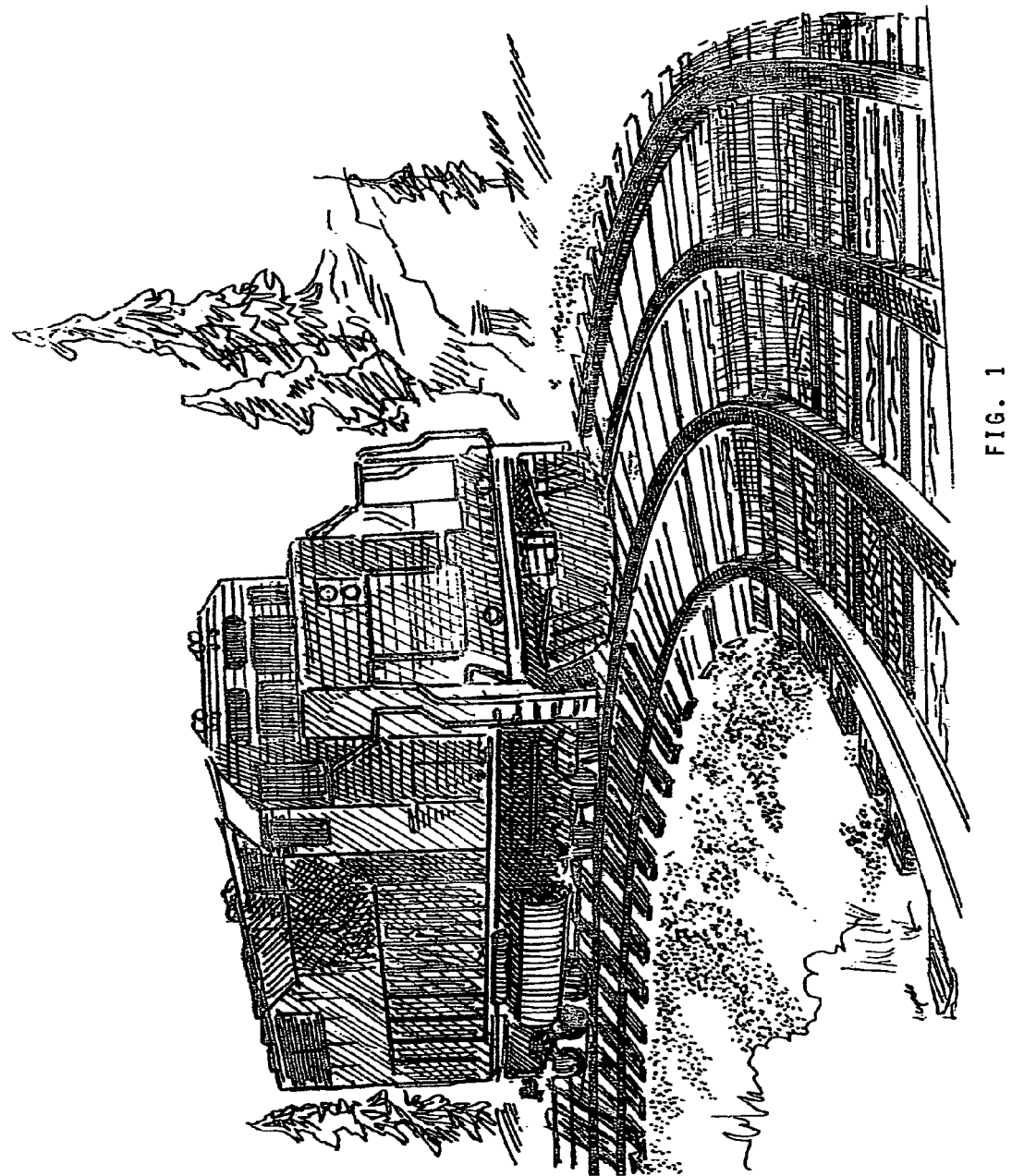
FIG. 1 Engines—I show the lead engine on the standard rail track system, which is centred on the four track rail system.
Figure 2:
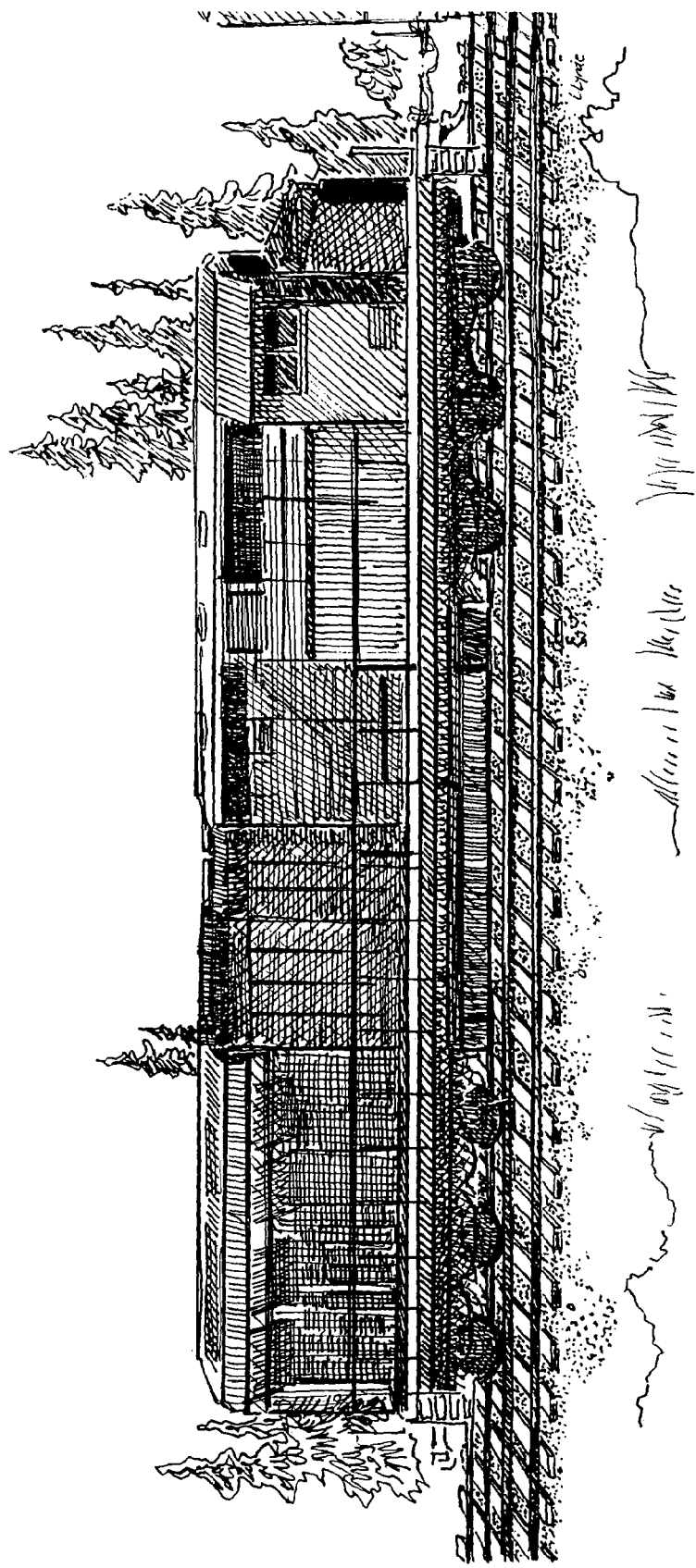
FIG. 2 Engines—I show the second engine again on the standard rail track system. The second engine is required for use as a train ferry or as a freight train.
Figure 3:
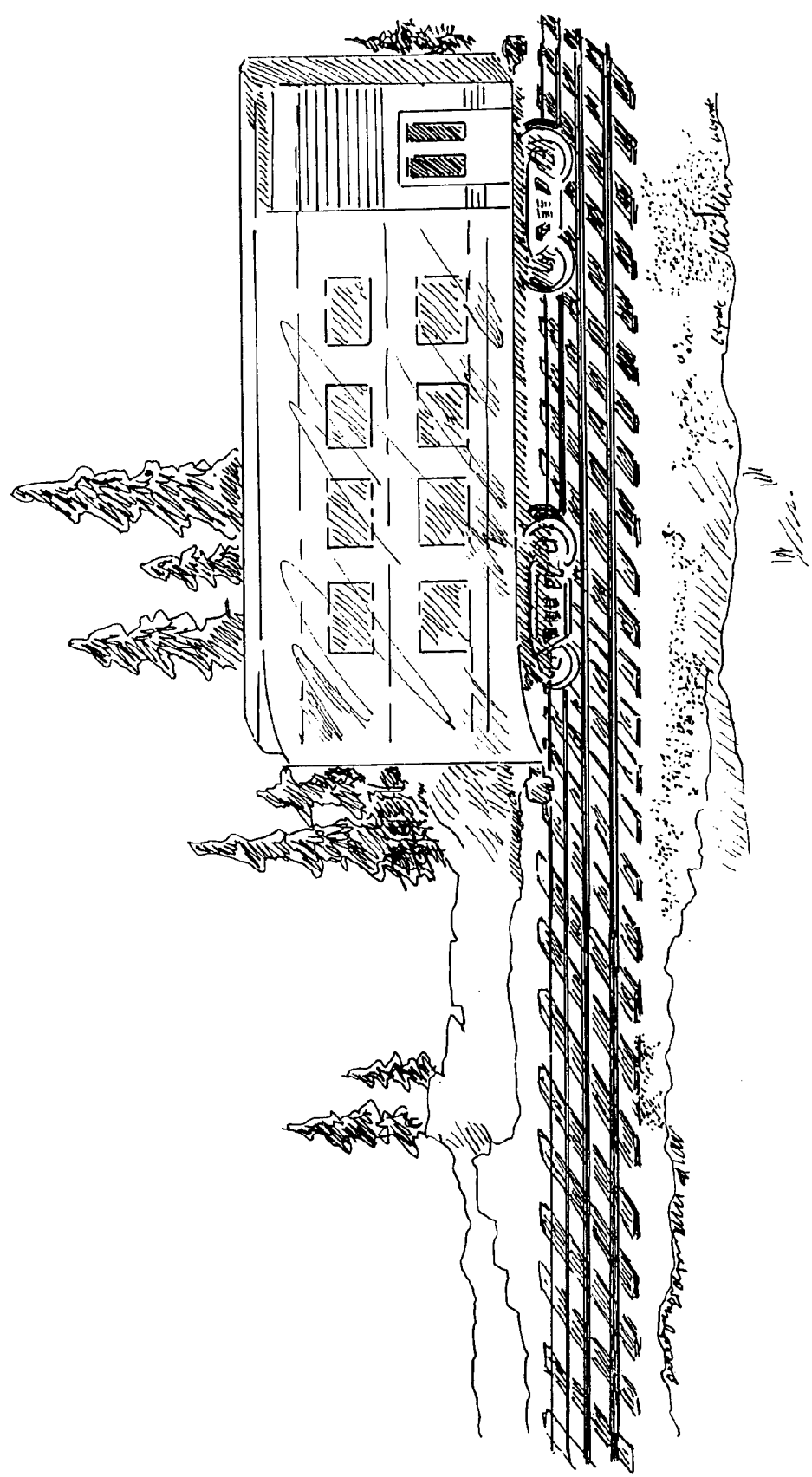
FIG. 3 Engine Crew Cabin Car—My original concept was to use the four track rail system, as a train ferry, for tourist travel to see the internal sites of the country.
Figure 4:
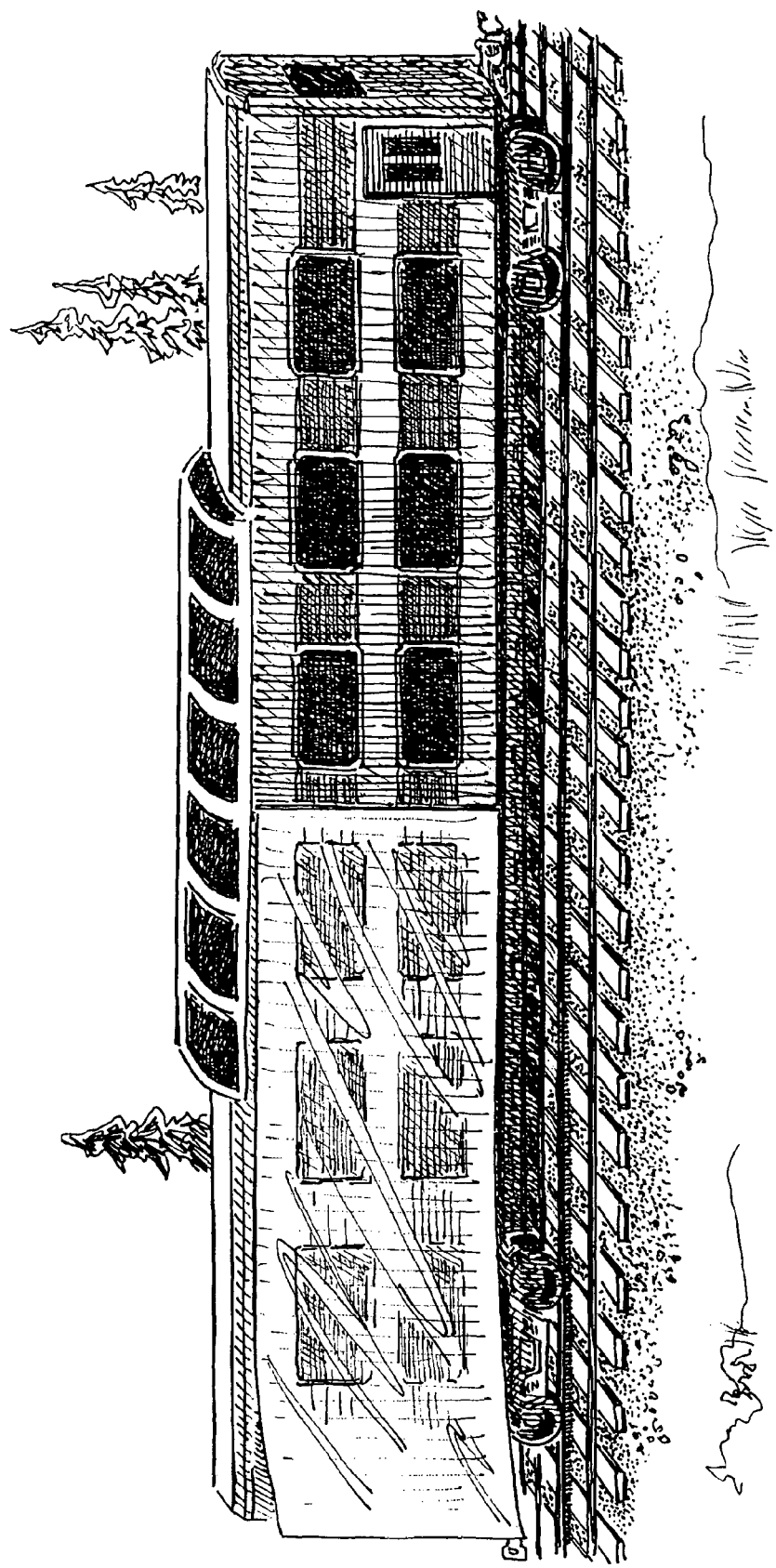

FIG. 4 Regular Double Deck Passenger Car—In reference to a train ferry for tourist travel, I show a standard double deck passenger car on the standard two track rail system, with a wind deflector.

This car is mainly used for people travelling short distances without their vehicles. It too is equipped with the wind deflector. They are designed with clear acrylic plastic and can be folded along the side of the car.

All cars with wind deflectors would always be placed in front of the wider rail cars.

Figure 5:
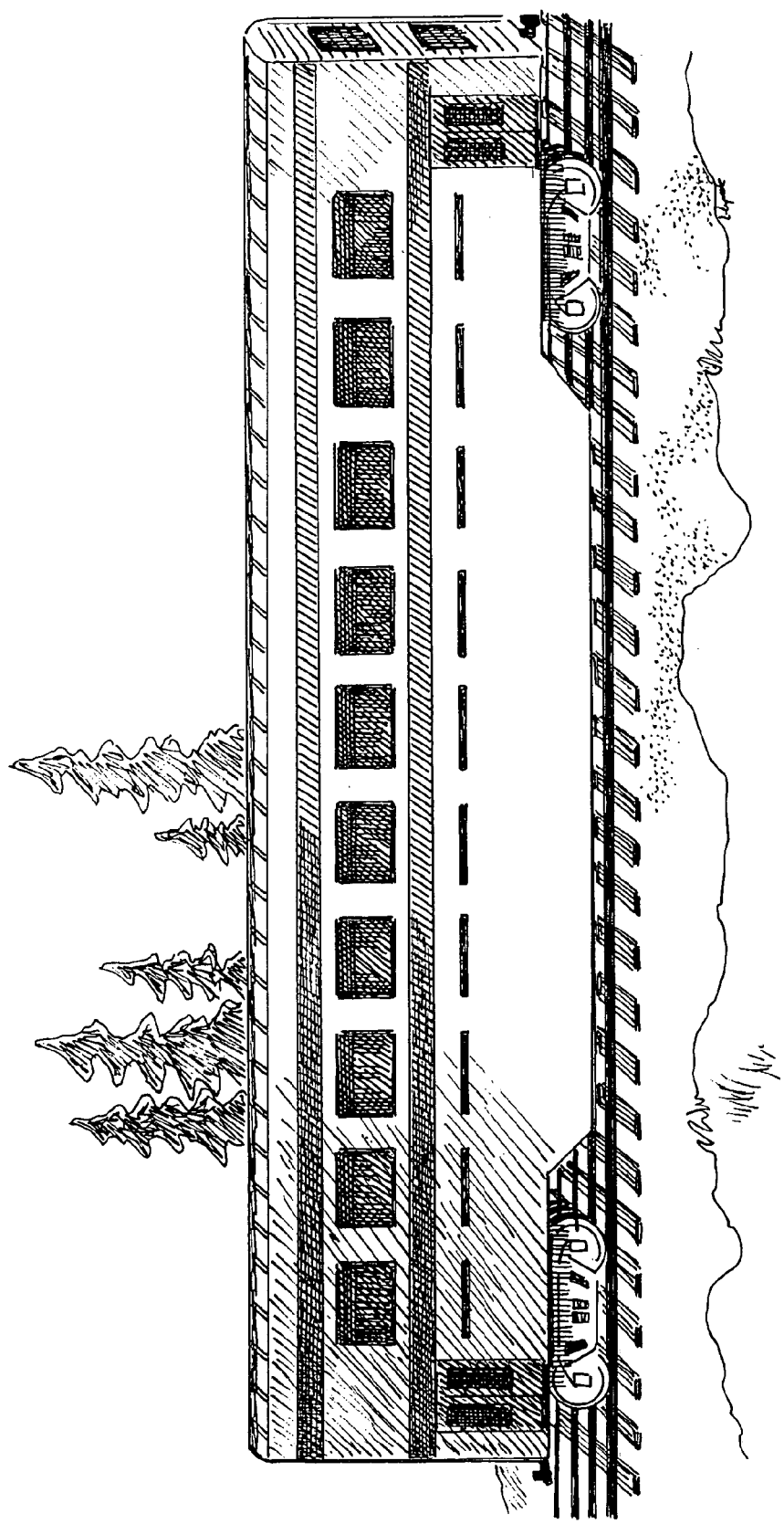

FIG. 5 Casino and Diner Car—It is used for relaxation and it could have a children's play area. The diner above could be a separate car as could the casino car, all dependent on the volume of tourists and passengers.

Figure 6:
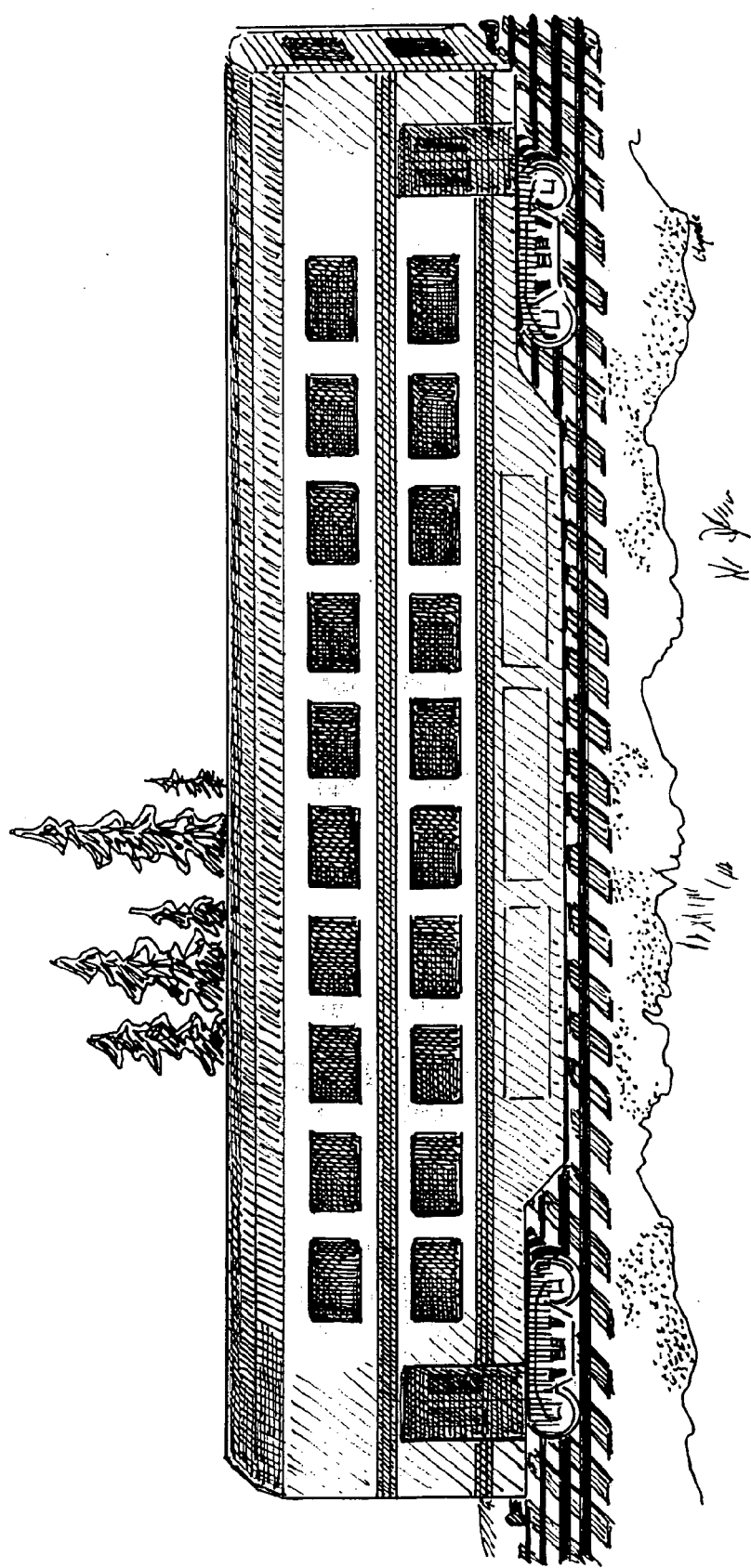

FIG. 6 Double Deck Cabin Car—It could have 40 cabins of 8 feet by 7 feet and the configuration can be adjusted to have various sizes of cabins each with their own showers and toilet facilities. A first aid room would be designed in one of the cabin cars.

The bottom of the car would house water storage tanks as well as waste water storage tanks. This car, as well as all other cars shown, are 80 feet long, 20 feet high and 20 feet wide. All cars would have standard bogies with two additional wheels on each side of the bogies.

Figure 7:
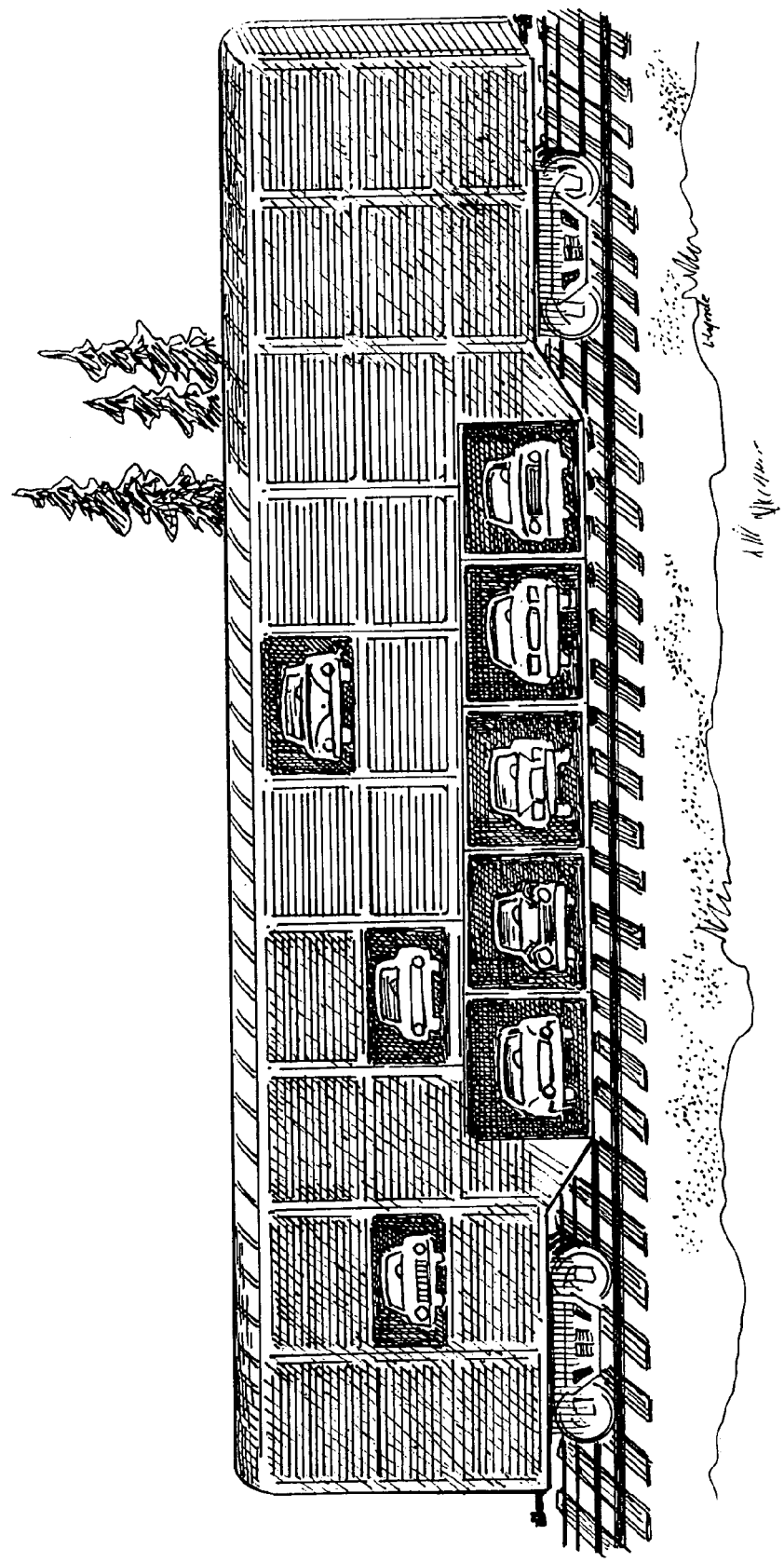

FIG. 7 Auto Transporter Cars are all Triple Deck Cars—On these cars the vehicles are loaded from either side in each individual bay, each with their own rollup door. The car shown will carry 25 automobiles. Loading and unloading cars would require fixed ramps or special hydraulic lifts for the second and third level cars.

A tourist travelling with their car can easily receive it at whatever stop they have planned.

Figure 8:
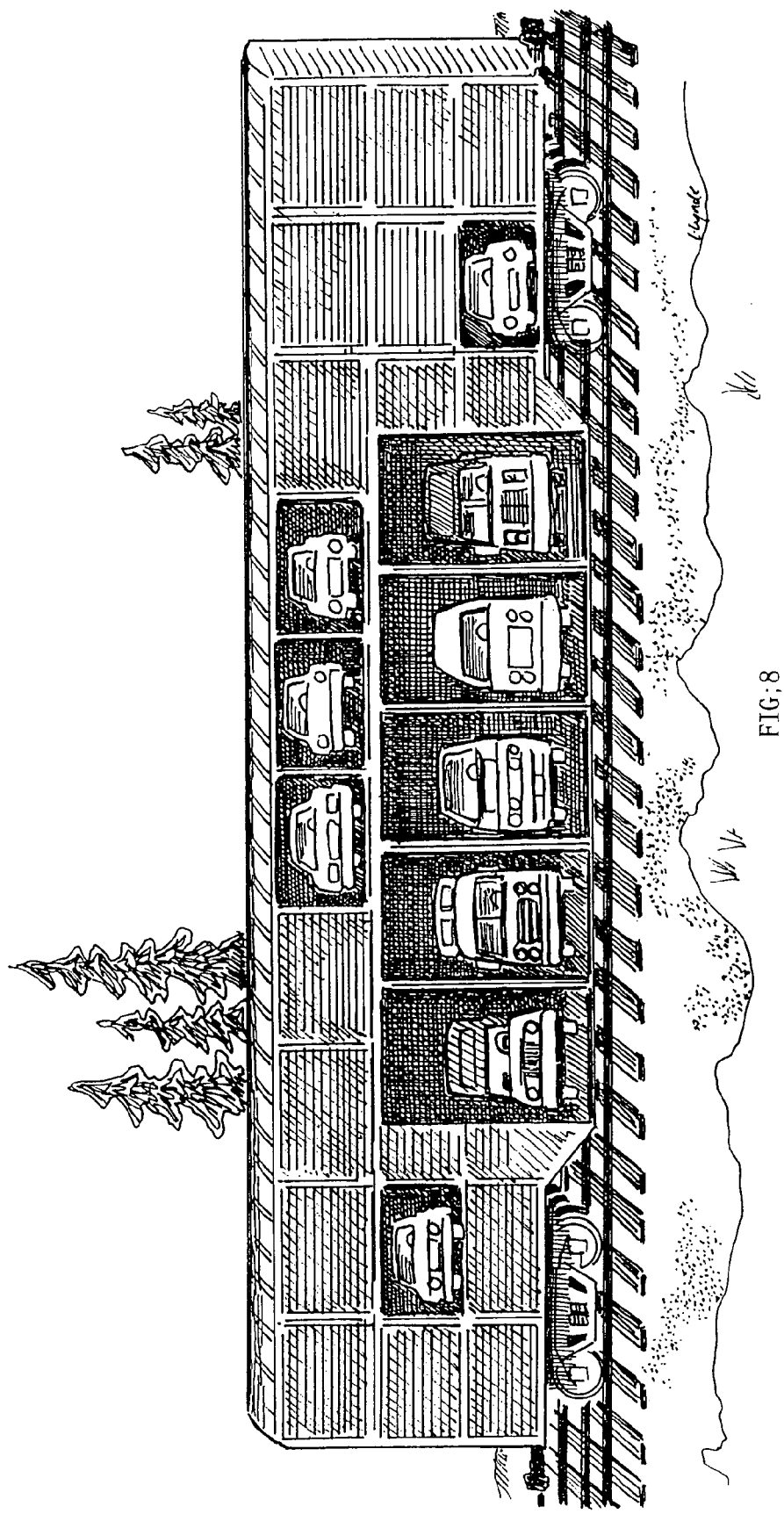

As an Auto Transporter rail car, only 10 cars would be needed to carry 250 automobiles whereas the present system requires 23 auto transporter cars to carry 250 automobiles FIG. 8 Auto and RV Transporter Car—Because of the many different vehicles on the market and for handicap people travelling with their RV, tourists can receive their RV at whatever stop they have planned. Note, as a train ferry it will have designated stops.

This redesigned transporter car will carry 14 automobiles and 5 RV vehicles, by eliminating 5 spaces on the second level, making 5 bays of 8 feet wide by 12 feet high + or –.

Figure 9:
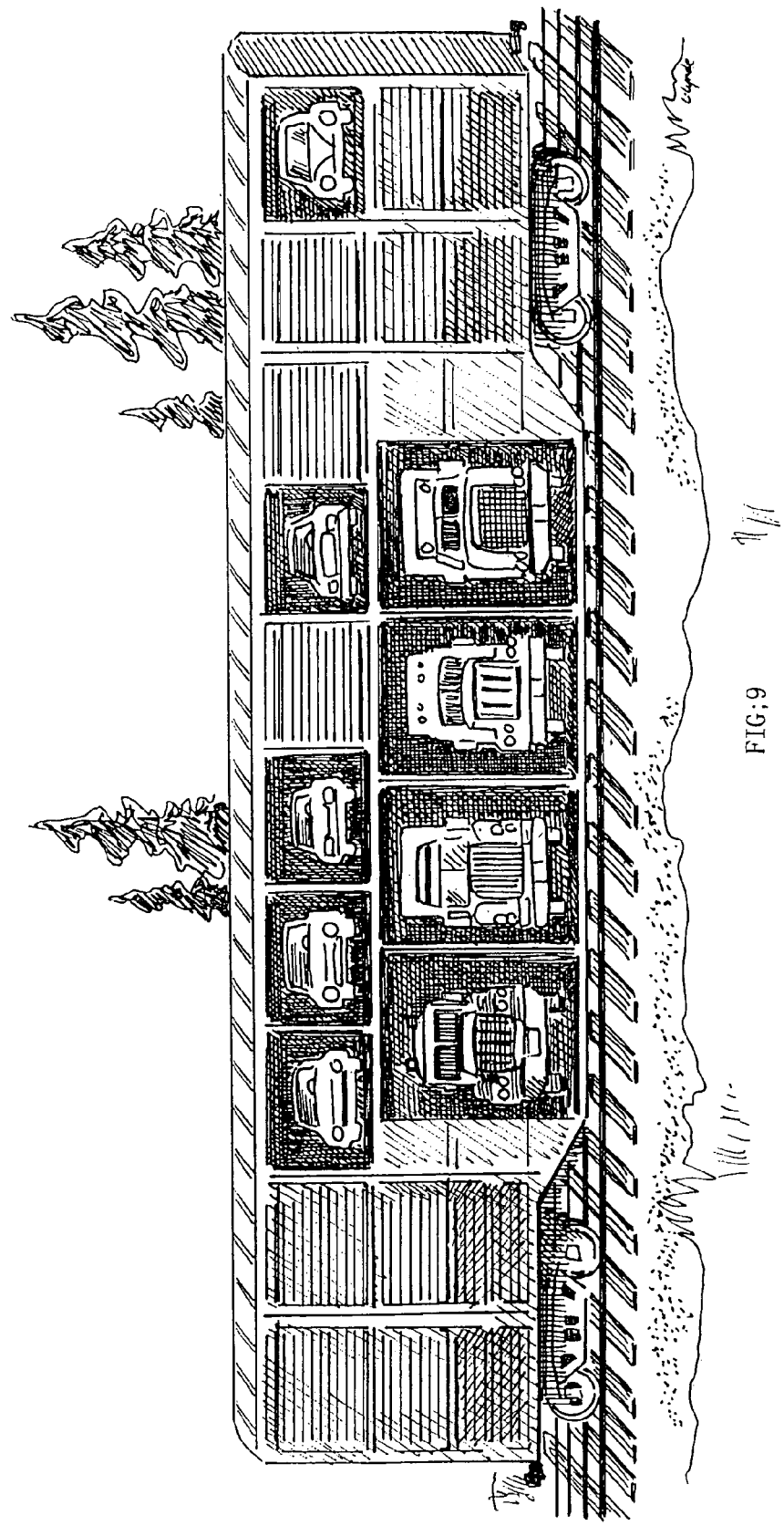

FIG. 9 Auto and Truck Chassis Transporter Car—This car is specially redesigned to carry 4 diesel truck and chassis vehicles and 14 automobiles, again the versatility of unloading one or more vehicles at the destinations planned without interfering with the rest of the vehicles. Each truck bay will be 10 feet wide and 12 feet high + or –.

Figure 10:
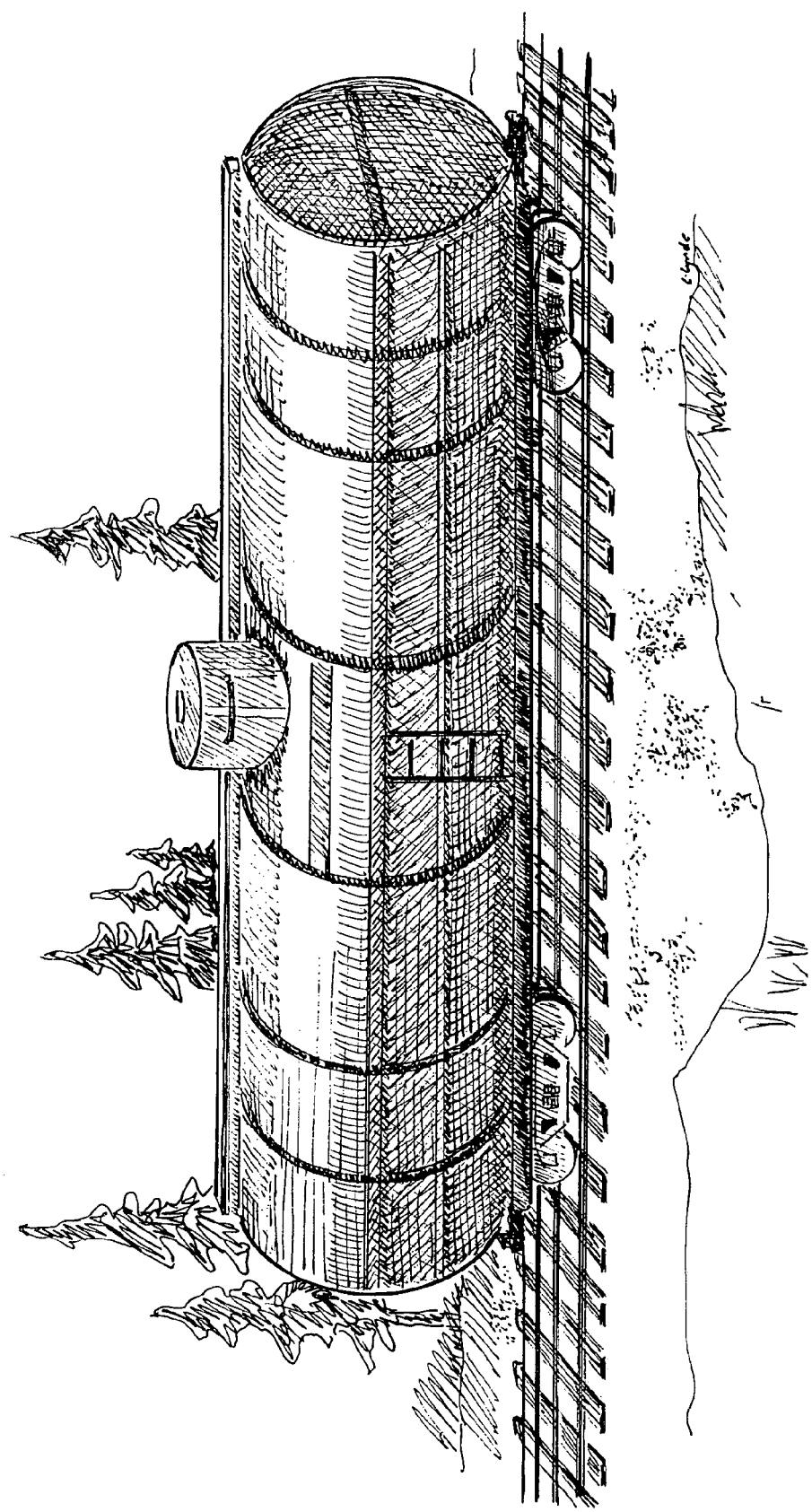

FIG. 10 70 Foot Tanker Car—Because of its width, this car can hold up to 3500 barrels of oil, water, etc. Imagine what multiples of this tanker car could carry.

Figure 11:
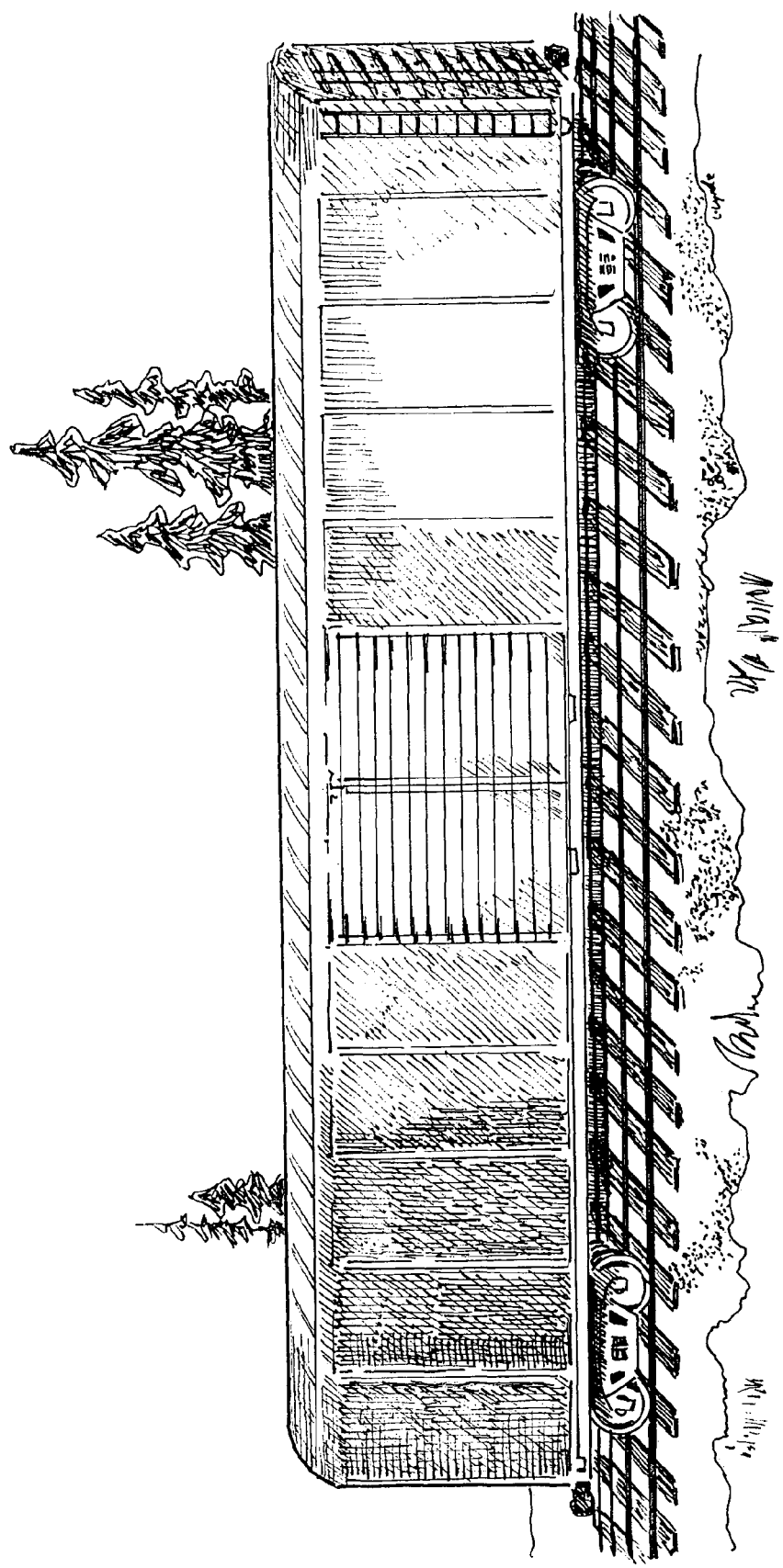

FIG. 11 80 Foot Long Box Car—If used in conjunction with a Train Ferry, it can be configured to carry all the necessities required. It would also serve as a kitchen for the diner. As a freight train it only requires 50 of these cars to equal the capacity of 100 regular freight cars.

Figure 12:
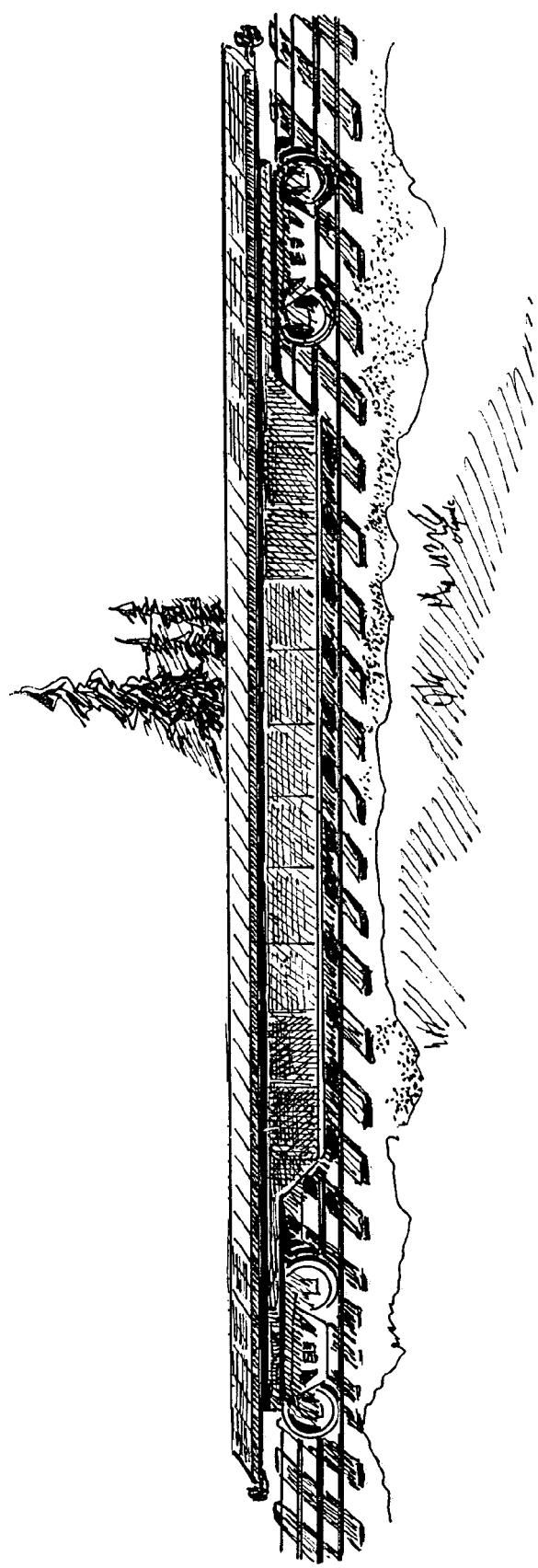

FIG. 12 Flat Car—Because of its width it would have many uses to serve industry as various lengths can also be made. It would be ideal for transporting or shipping large equipment without dismantling them, especially farm machinery.

Figure 13:
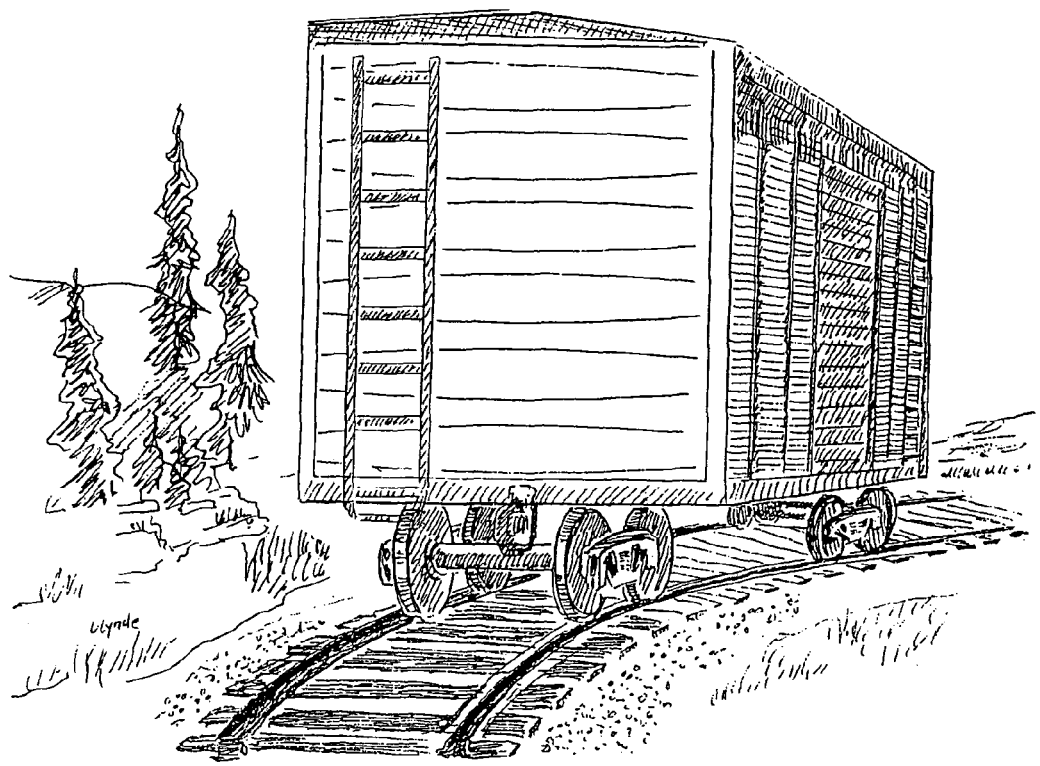

FIG. 13 End View of Standard Box Car—We show the standard width of the existing rail tracks which are 62 inches + or – with the end view of a standard rail box car which is about 10 feet + or – in width, in use today.

Figure 14:
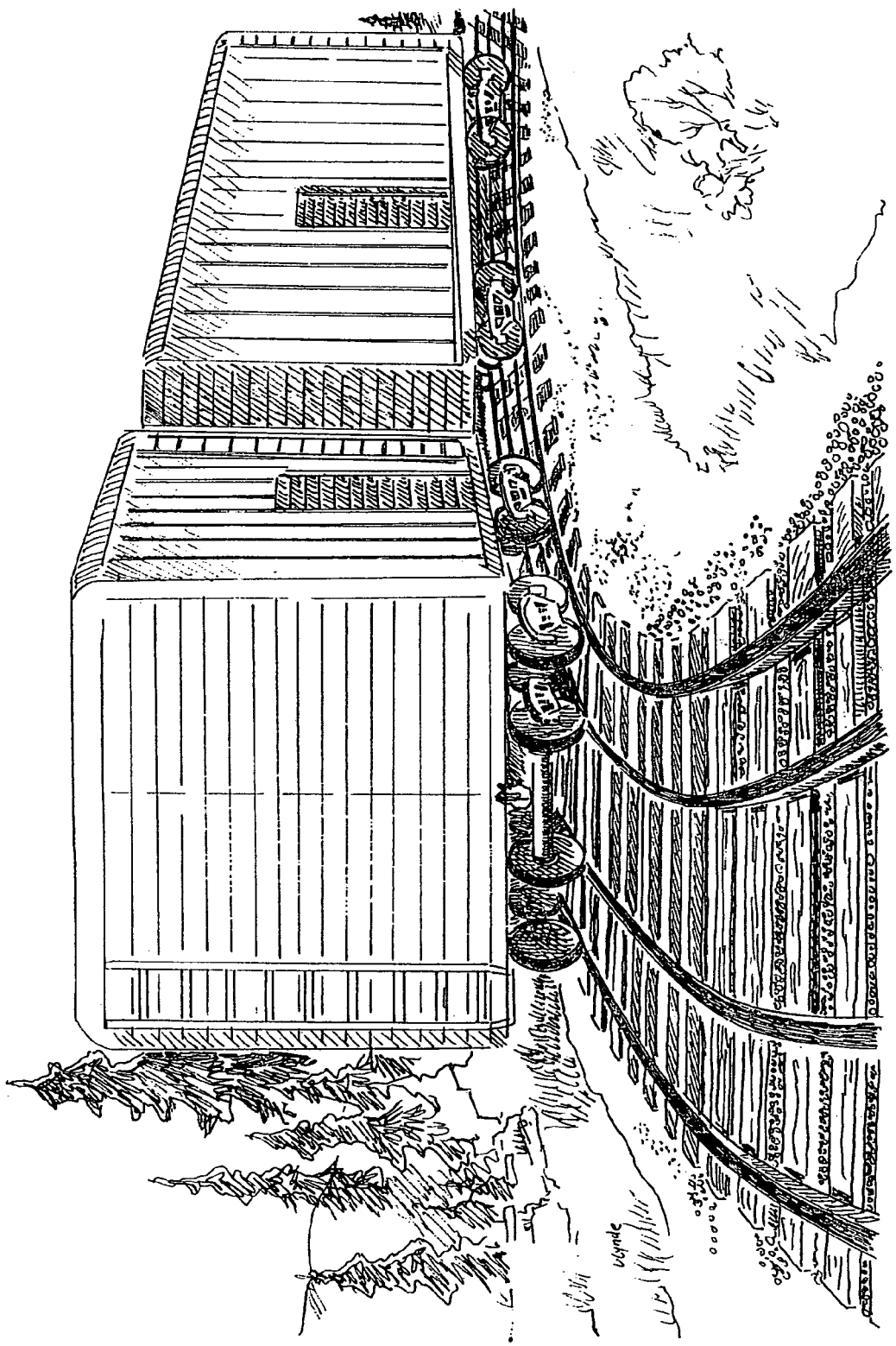

FIG. 14 End View of the Wider Box Car—This design shows the end view of the new wider rail cars of 20 feet + or – in width with the standard bogies centred on the standard rail tracks and the two single bogies on the added two rails on either side of the standard rail tracks. The Rail Road Industry will have to decide where and how to place the two outside bogies.

DETAILED DESCRIPTION OF THE INVENTION

As you view the artist drawing of FIG. 13 it shows the end view of the standard box car with the bogies on the standard rail tracks. This system is in use today throughout North America. Again, as you view the artist drawing of FIG. 14 it shows the end view of a twenty foot wide box car on the Four Track Rail System, with the standard rail bogie in the center and the bogies on the outside added tracks. This drawing shows the Four Track Rail System which is the basic idea of my patent application.

Of interest, it should be noted that the engines do not change as the standard rail line does not change. It could be possible with this four track system to still use the regular train systems as well as the wider car system.

If someone was to adopt this four track system, the work opportunities would be tremendous. I liken it to how the Europeans built the Air Bus 380 which created thousands of permanent jobs.

The invention claimed is:

1. A four rail track system for the transportation of goods and people, comprising:
 a first pair of rails set at a standard width and a second pair of rails set outside of the first pair of rails at a wider distance;
 rail ties of a longer length to accommodate both the first and second pair of rails;
 a trailing railcar designed to travel on the second pair of rails and designed to accommodate vehicles oriented perpendicularly relative to a length direction of the rails, said trailing railcar having one or more levels;
 a leading railcar or locomotive, traveling directly in front of the trailing railcar, on the first pair of rails, said leading railcar or locomotive equipped with wind deflectors mounted on opposing sides and extending gradually outward in a width direction of the rails, said wind deflectors made of clear acrylic plastic.

2. The four track rail system of claim 1, wherein the vehicles are comprised of 25 automobiles in one railcar.

3. The four track rail system of claim 1, wherein the vehicles are comprised of 14 automobiles and 5 recreational vehicles in one railcar.

4. The four track rail system of claim 1, wherein the vehicles are comprised of 14 automobiles and 4 truck chassis vehicles in one railcar.

5. The four track rail system of claim 1, wherein the second pair of rails is set at a distance of approximately 11 feet 3 inches.

* * * * *